United States Patent
Salenbauch et al.

(10) Patent No.: US 6,168,059 B1
(45) Date of Patent: Jan. 2, 2001

(54) STORAGE COMPARTMENT WITH A DISPLACEABLE LID ARRANGEMENT

(75) Inventors: Hermann Juergen Salenbauch, Geretsried; Alexander Klatt, Munich, both of (DE); Robert Stancel, Los Altos Hills, CA (US); Alex Kazaks, La Crosse, WI (US); Grace Tseng, Palo Alto, CA (US); Leon Segal; John Raff, both of Menlo Park, CA (US)

(73) Assignee: Bayerische Motoren Werke Aktiengesellschaft, Munich (DE)

( * ) Notice: Under 35 U.S.C. 154(b), the term of this patent shall be extended for 0 days.

(21) Appl. No.: 09/160,754

(22) Filed: Sep. 25, 1998

(51) Int. Cl.[7] .............................. B60R 7/04; B65D 43/20
(52) U.S. Cl. ..................... 224/539; 220/505; 220/525; 220/345.5; 296/37.8
(58) Field of Search ..................... 220/502, 505, 220/523–526, 255, 345.1, 345.4, 345.5, 348, 822, 823; 296/37.8, 37.9, 37.14; 224/539, 275

(56) References Cited

U.S. PATENT DOCUMENTS

| | | | | |
|---|---|---|---|---|
| 698,558 | * | 4/1902 | Rosenbaum | 220/345.5 X |
| 1,265,148 | * | 5/1918 | Warren | 220/345.5 X |
| 2,097,480 | * | 11/1937 | Visser | 296/37.8 |
| 3,022,107 | * | 2/1962 | Daniels | 296/37.8 |
| 3,481,506 | * | 12/1969 | Vevirit et al. | 220/822 X |
| 4,512,503 | * | 4/1985 | Gioso | 224/539 |
| 4,809,897 | * | 3/1989 | Wright, Jr. | 224/539 X |
| 4,854,632 | * | 8/1989 | Kreuze et al. | 296/37.8 |
| 5,884,799 | * | 3/1999 | Korber et al. | 224/539 X |

FOREIGN PATENT DOCUMENTS

| | | | |
|---|---|---|---|
| 196 46 809 A1 | 5/1998 | (DE) . | |
| 19646809A1 | 5/1998 | (DE) . | |
| 0659970A2 | 6/1995 | (EP) . | |
| 2549787 | * 2/1985 | (FR) | 224/539 |
| 59-102637 | * 6/1984 | (JP) | 224/539 |
| 95/00361 | * 1/1995 | (WO) | 224/275 |

OTHER PUBLICATIONS

German Search Report, Aug. 23, 1999.

* cited by examiner

Primary Examiner—Nathan J. Newhouse
(74) Attorney, Agent, or Firm—Evenson, McKeown, Edwards & Lenahan, P.L.L.C.

(57) ABSTRACT

A storage compartment is covered by two lids that can be opened by a handle in such a manner that the two lids expose a storage compartment from the middle to the edges. An additional compartment is connected to the handle. This compartment, depending on the direction of motion of the handle, is pushed beneath a hider or is moved over the storage compartment in the direction of travel FR.

15 Claims, 3 Drawing Sheets

STORAGE COMPARTMENT WITH A DISPLACEABLE LID ARRANGEMENT

BACKGROUND AND SUMMARY OF THE INVENTION

The invention relates to a storage compartment with a displaceable lid arrangement as known, for example, from German patent document DE 196 46 809 A1.

An object of the present invention is to improve the functionality and external appearance of a storage compartment of this kind.

This and other objects and advantages are achieved by the storage compartments with a displaceable lid arrangement, where instead of the cover shutter of the known storage compartment, an arrangement of two sliding lids is provided. To open or close the storage compartment, the sliding lids are simultaneously moved away from one another or toward one another. In this way, the storage compartment (starting with the two lids in the closed position) is initially exposed in its middle area and then to the edge areas. As a result, an advantageous access to objects inside the storage compartment is achieved. In addition, the storage compartment according to the invention has an attractive external appearance. This pleasing appearance is further enhanced by the original movement pattern of the lids when the storage compartment is opened.

The term "lid" includes all types of covers, for example rigid lids, flexible lids, shutters, etc.

In a preferred embodiment according to the invention, the storage compartment has a "surprise effect." In essence, depending on the choice of the movement direction of the handle, two different storage compartments are opened to the user. This is achieved by connecting a small additional compartment to the handle, so that in one direction of movement of the handle the storage compartment is displaced together with the lid on top of it to open the compartment so that the other storage compartment does not appear. By moving the handle in the other direction, on the other hand, the additional compartment is pushed beneath and over the entire width of the storage compartment. In this way, with one handle that can be moved in various directions, two different compartments can be opened which subsequently appears to the customer to be located in the same place.

In addition to the surprise effect of this storage compartment according to the invention, an expanded usability is also achieved, since on the one hand the additional compartment can be used for small objects such as coins, keys, etc. and on the other hand the larger storage compartment located beneath can be used for larger objects space requirement. The additional compartment can also hold operating elements that do not control primary vehicle functions (for example, a keypad for a telephone).

In yet another embodiment of the present invention, the handle is coupled to the two lids by a rocker that is guided in guide paths which are staggered vertically and as a result is pivoted accordingly. Access to the driving elements of the corresponding lid is gained by pivoting the handle.

In an alternative embodiment according to the invention, the lid can also be magnetically coupled to the handle.

In still another embodiment of the present invention, the simultaneous movement of the two lids is effected by a cable that reverses the direction of movement by an intersecting path.

In still another embodiment according to the invention, the lids are coupled together by a gear that produces a movement of the two lids in opposite directions. Instead of pinion coupling by the gear, it is also possible to have frictional coupling by a roller, or the like.

Other objects, advantages and novel features of the present invention will become apparent from the following detailed description of the invention when considered in conjunction with the accompanying drawings.

DETAILED DESCRIPTION OF THE DRAWINGS

Figure 1:
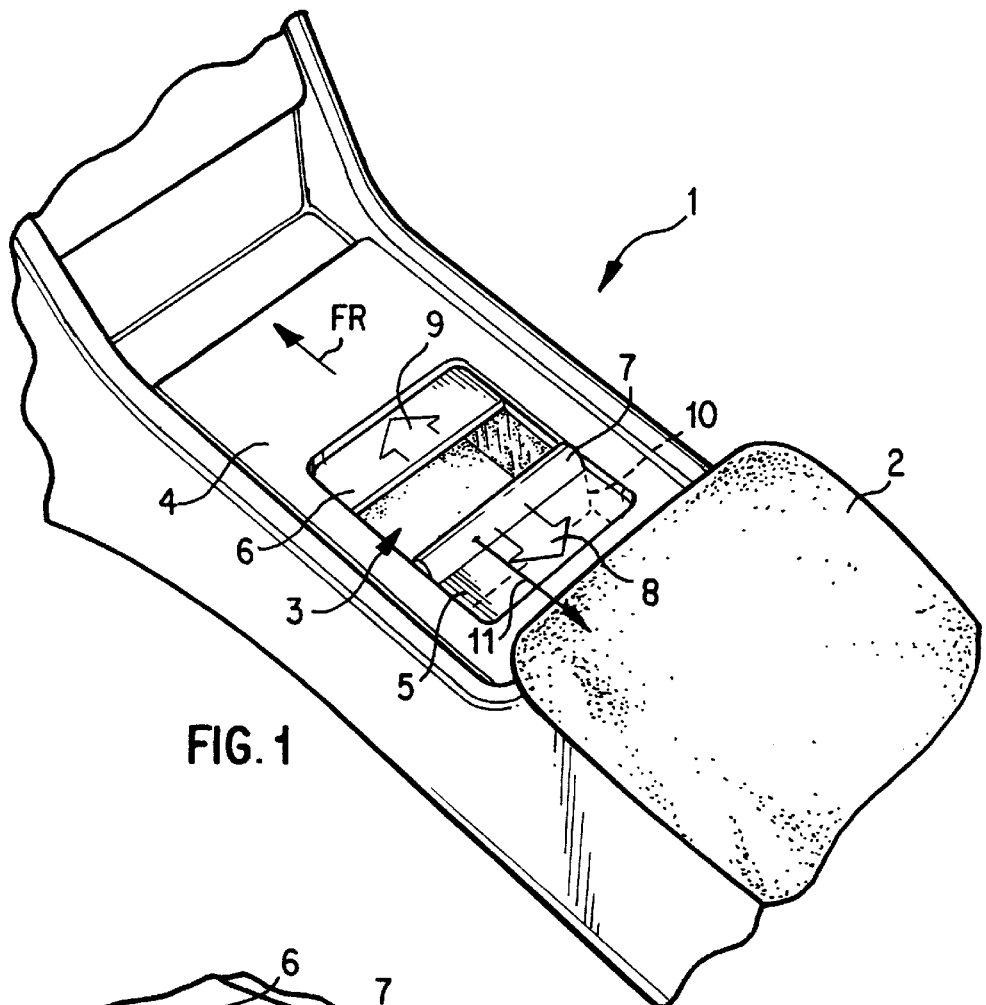
FIG. 1 is a perspective view of the area of a center console of a motor vehicle, with a storage compartment according to the invention shown with the lids in the half-open position.
Figure 2:
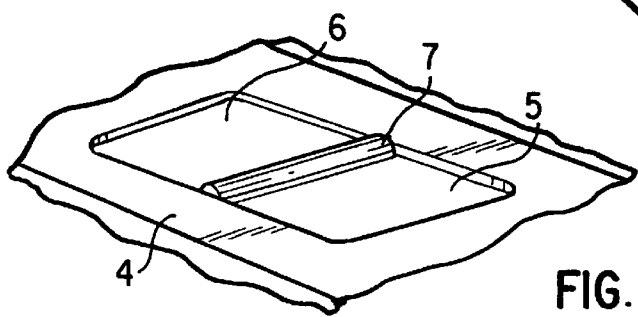
FIG. 2 is a partial view of FIG. 1 with the lids in the closed position.

FIG. 1 shows a center console 1 of a motor vehicle which has a storage compartment 3 according to the invention in the area in front of an armrest 2. Storage compartment 3 is framed by a hider 4 and closed by two lids 5 and 6. Lids 5 and 6 are operated by a common handle 7 that opens the two lids 5 and 6 in opposite directions as indicated by arrows 8 and 9, starting from a closed position as shown in FIG. 2.

As is evident (especially from FIG. 3), in addition to storage compartment 3, there is a comparatively small-volume additional compartment 10 connected directly with handle 7 (see also the dashed view in FIG. 1). To use this additional compartment 10, a coupling device is provided which, depending on the direction of movement of handle 7, connects the latter with either the first or the second lid 5 or 6.

In the example shown in FIG. 1, handle 7 is moved in the displacement direction indicated by arrow 11 opposite to travel direction FR, so that first lid 5 is coupled with handle 7. As a result, additional compartment 10 is pushed completely under hider 4 and the area of armrest 2. Here, additional compartment 10 is located behind handle 7 relative to travel direction FR (starting at a position as shown in FIG. 2 magnetically), and halfway covers storage compartment 3. At the end of the opening movement, storage compartment 3 is fully opened. Since lid 5 is moved simultaneously with additional compartment 10, additional compartment 10 remains covered by lid 5 and is therefore "invisible" during the entire opening process in the direction of arrow 11.

Figure 3:
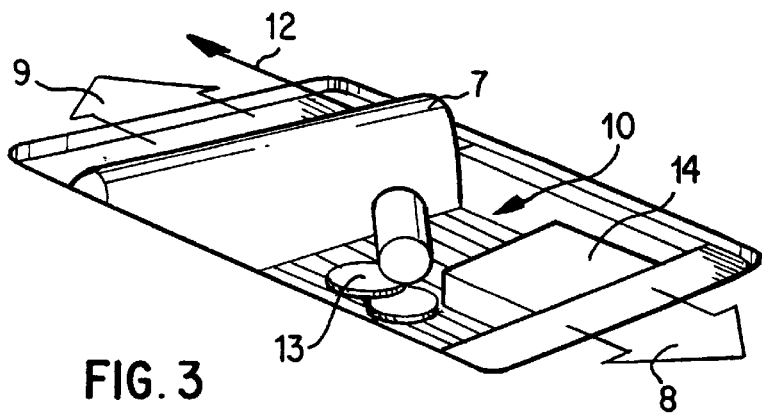
FIG. 3 is another partial view of FIG. 1 with the lids open and the additional compartment accessible.

On the other hand, according to FIG. 3, with a movement of handle 7 in the direction of arrow 12, second lid 6 is coupled to handle 7. During this opening movement, additional compartment 10 is moved together with handle 7 in travel direction FR. As a result, lid 5 simultaneously performs an opening movement in the direction opposite to the opening direction of lid 6. Depending on the degree to which lid 6, and therefore additional compartment 10, is moved in travel direction FR, lid 5 moves opposite to the direction of travel. At the end of the opening movement, the additional compartment 10 completely covers storage compartment 3. In a similar manner, storage compartment 3 remains "invisible" and does not appear to the user, because during the entire opening process (as indicated by arrow 12) lid 6 which is moved together with handle 7 in travel direction FR covers the storage compartment 3 located beneath.

As a result of the present invention, the user is provided with a pleasant surprise, since two different storage compartments 3 and 10 are apparently located in the same place. Depending on the opening direction 11 or 12, however, only one of the two storage compartments 3 or 10 is visible to the user.

Storage compartment 3 is provided to hold larger objects, while small parts such as coins 13, cigarette packs 14, etc. can be stored in additional compartment 10.

FIGS. 4 to 7 show the device for coupling the two lids 5 and 6 to the handle 7 and/or with one another in detail.

Figure 5:
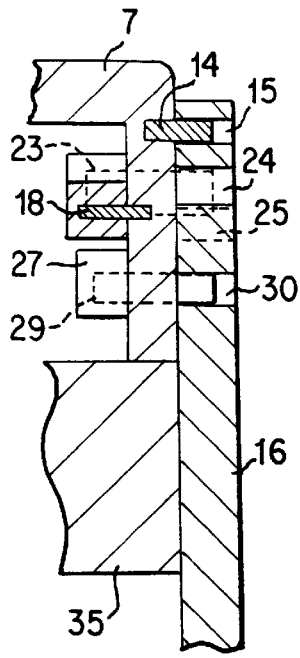
FIG. 5 is a section along section line V—V in FIG. 4.
Figure 4:
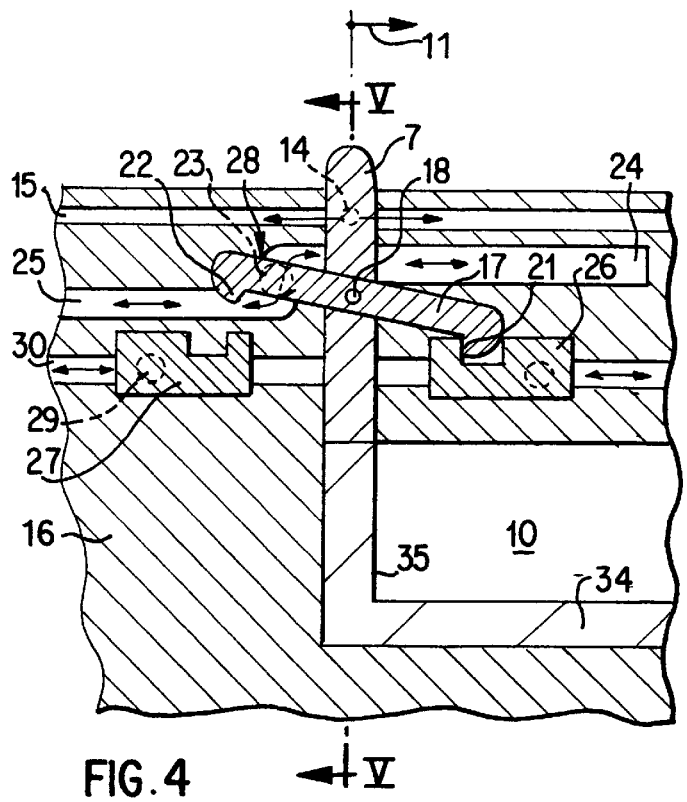
FIG. 4 is an enlarged section of the area of the rocker of the storage compartment, in the initial phase of the opening process in the direction of travel.

As shown in FIGS. 4 and 5, additional compartment 10, together with its bottom part 34 and its sidewall 35, is rigidly connected to handle 7 and is necessarily moved together with the latter. Handle 7 is guided by a guide pin 14 in a linear guide path 15 of housing 16 of storage compartment 3. A rocker 17 is pivotably mounted on handle 7 (pivot axis 18). Rocker 17 has two arms with latching noses 21 and 22. Rocker 17 is guided by a pin-shaped control cam 23 in a first or second section 24 or 25 of a guide path. The two sections 24 and 25 of the guide path merge with one another at a jog 28. Latching noses 21 and 22 cooperate with driving elements 26 and 27 which are connected with lids 5 and 6 and are guided by pins 29 in a common guide path 30.

Figure 6:
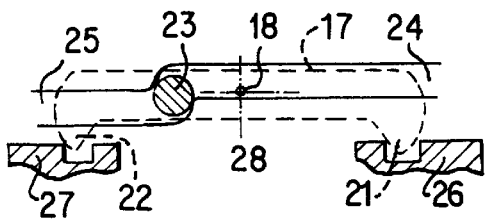
FIG. 6 is a view corresponding to FIG. 4 with the handle of the storage compartment in the initial position.
Figure 7:
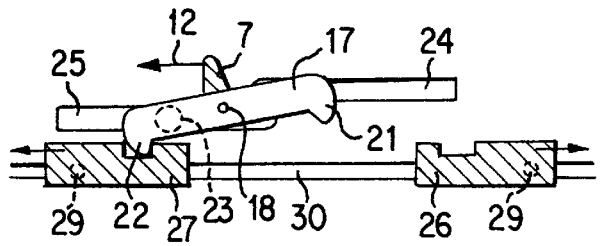
FIG. 7 is a view corresponding to FIG. 4 in the initial phase of the opening process opposite to the direction of travel.

FIGS. 4 and 5 show handle 7 and all of the elements cooperating with it in the beginning phase of the opening of lids 5 and 6 that are still closed, with the movement direction of handle 7 in the direction shown by arrow 11. In contrast to this, FIG. 6 shows the horizontal starting position of rocker 17 in which control cam 23 is located exactly at jog 28, so that rocker 17 is disengaged from driving elements 26 and 27.

In contrast, with a movement of handle 7 in the direction of arrow 12 (FIG. 7), rocker 17 is pivoted in the direction opposite to that shown in FIGS. 4 and 5 (with lid 6 being connected with handle 7). As a result, lid 5 disconnects from additional compartment 10 and moves in the direction opposite handle 7, thus exposing additional compartment 10.

By choosing movement direction 11 or 12, the user determines which lid 5 or 6 is to move together with handle 7 and thus determines which of storage compartments 3 or 10 is to be exposed.

Figure 8:
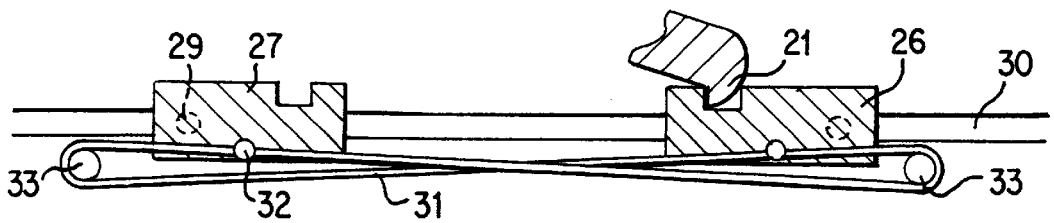
FIG. 8 is an enlarged section of the connecting means between the driving elements of the two lids.

The two lids 5 and 6 are coupled as shown in FIG. 8 by a cable 31 that connects the driving elements 26 and 27 of the two lids 5 and 6 with one another at points 32. Cable 31 is guided over return rollers 33. The intersecting path of cable 31 produces the movement of the two driving elements 26 and 27 and hence of lids 5 and 6 in opposite directions.

Figure 9:
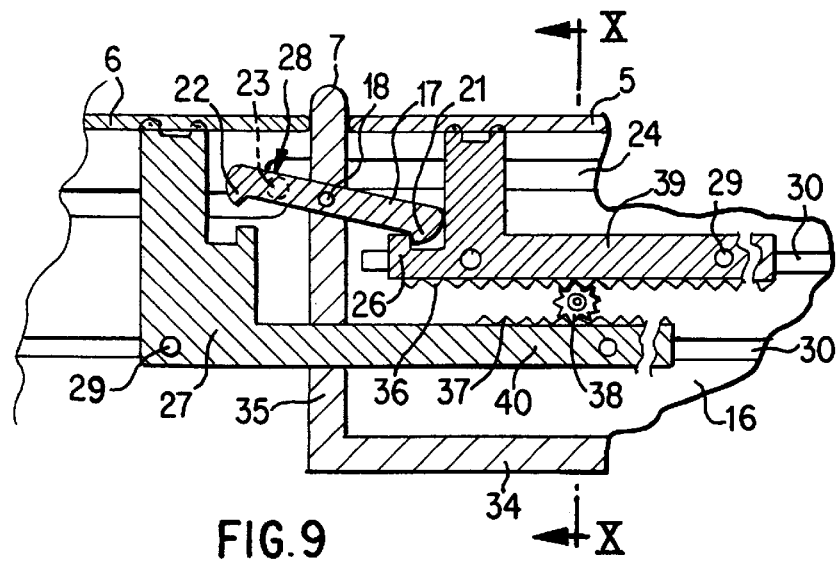
FIG. 9 is a view corresponding to FIG. 4 with a gear transmission for coupling the two lids.
Figure 10:
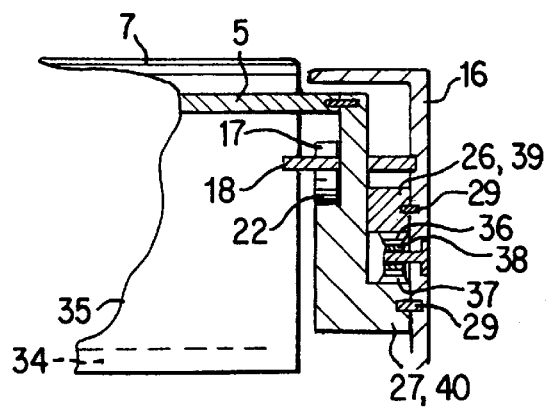
FIG. 10 is a section along section line X—X in FIG. 9.

FIGS. 9 and 10 show another embodiment of the invention in which the same or equivalent parts have been marked with the same reference numbers as in the previous figures. The movement of lids 5 and 6 in opposite directions in this case is produced by a gear transmission instead of cable 31 in FIG. 8. For this purpose, the driving elements 26 and 27 are elongated in the horizontal direction and have teeth 36 and 37 on these elongate sections 39 and 40 that resemble a rack. A gear 38 mounted on housing 16 engages these teeth 36 and 37 so that when one of lids 5 or 6 is displaced, 'the other lid 6 or 5 in that particular case is necessarily moved in the opposite direction.

Figure 11:
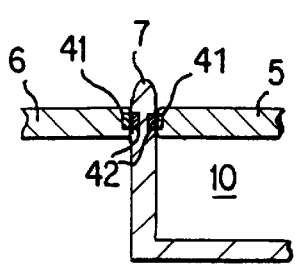
FIGS. 11 to 13 are schematic sectional views of a magnetic coupling of the handle to the two lids, with various opening states of the storage compartment.
Figure 12:
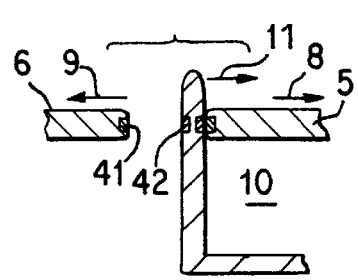
Figure 13:
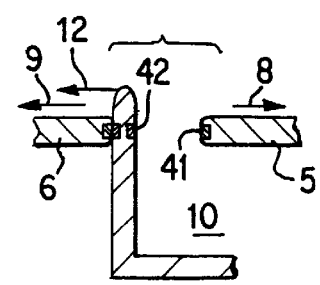

In the embodiment shown in FIGS. 11 to 13, the two lids 5 and 6 are coupled together magnetically, so that the rocker 17 shown in FIGS. 4 to 10 can be eliminated. As can be seen in the drawing, ferromagnetic inserts 41 are provided on the ends of lids 5 and 6 that face the handle. The inserts cooperate with permanent magnets 42 on both sides of handle 7.

FIG. 11 shows lids 5 and 6 in the closed position. To open lid 5, the magnetic retaining force between handle 7 and lid 6 must first be overcome before lid 5 can be shifted by handle 7 in the direction of arrow 11 (FIG. 12). For this shifting movement, the magnetic coupling between handle 7 and lid 5 has no function. When lid 5 is closed, however, lid 5 is pulled back by the magnetic coupling together with handle 7 opposite the direction of arrow 11 into its initial position. The opening and closing process of lid 6 (FIG. 13) takes place in a similar manner.

In the embodiment in FIGS. 11 to 13 as well, the opposite movements of lids 5 and 6 are produced by a cable 31 (FIG. 8), a gear transmission (FIGS. 9 and 10), or another equivalent device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage compartment with a displaceable lid arrangement, comprising:

a first displaceable lid;

a second displaceable lid, each covering approximately one half of a storage compartment;

a second storage compartment disposed beneath one of the first or second displaceable lids; and an assembly connecting the first and second displaceable lids to produce an opening movement of the first and second displaceable lids in which the first and second displaceable lids move in opposite directions from one another and a closing movement in which the first and second displaceable lids move toward one another;

wherein when the assembly is moved in a first direction the second storage compartment is displaced together with the respective first and second displaceable lid to reveal only the first storage compartment, and when a handle is moved in a second direction the second compartment is pushed an entire width of the storage compartment to reveal only the second storage compartment.

2. A storage compartment with a displaceable lid arrangement, comprising:

a first displaceable lid;

a second displaceable lid, each lid covering a first storage compartment when in a respective closed position;

a second storage compartment disposed beneath one of the lids; and an assembly connecting the first and second displaceable lids to produce an opening movement of the first and second displaceable lids in which the first and second displaceable lids move in opposite directions from one another and a closing movement in which the first and second displaceable lids move toward one another;

wherein when the assembly is moved in a first direction the second storage compartment is displaced together with the respective first and second displaceable lid to reveal the first storage compartment and conceal the second storage compartment, and when the assembly is moved in a second direction the second compartment is moved to a position revealing the second storage compartment.

3. A storage compartment according to claim 2, wherein the storage compartment is disposed in a passenger vehicle.

4. A storage compartment according to claim 2, wherein the assembly connecting the first and second displaceable lids is a gear which is disposed between two superimposed sections, said gear being coupled with the lids and engaging teeth on sections which are directed toward one another.

5. A storage compartment according to claim 4, wherein the storage compartment is disposed in a passenger vehicle.

6. A storage compartment according to claim 2, wherein the assembly connecting the first and second displaceable lids includes a circulating cable with an intersecting pattern.

7. A storage compartment according to claim 6, wherein the storage compartment is disposed in a passenger vehicle.

8. A storage compartment according to claim 2, wherein the assembly includes a handle which in an initial position, with the first and second displaceable lids closed, is disposed substantially in the middle of the first storage compartment, wherein, based on a displacement direction of the handle from an initial position, a coupling device connects the handle with the first or second displaceable lid, and wherein the second storage compartment is connected to the handle and is adapted to move together with the handle.

9. A storage compartment according to claim 8, wherein the storage compartment is disposed in a passenger vehicle.

10. A storage compartment according to claim 8, wherein the coupling device comprises magnetically cooperating elements on each of a handle and the respective first and second displaceable lids.

11. A storage compartment according to claim 10, wherein the storage compartment is disposed in a passenger vehicle.

12. A storage compartment according to claim 8, wherein the coupling device comprises a rocker pivotably mounted on the handle, the rocker further having two arms, each arm having a driver disposed thereon for engaging a driving element of respective ones of the first and second displaceable lids, and wherein the rocker is guided in a guide which extends in a displacement direction of the first and second displaceable lids.

13. A storage compartment according to claim 12, wherein the storage compartment is disposed in a passenger vehicle.

14. A storage compartment according to claim 12, wherein the guide has two path segments which are offset with respect to one another, said segments causing a tilting of the rocker in opposite directions and hence alternative engagement with the driving element of the respective first and second displaceable lids, and the two path segments blend with one another at a jog that corresponds to a closed position of the first and second displaceable lids.

15. A storage compartment according to claim 14, wherein the storage compartment is disposed in a passenger vehicle.

\* \* \* \* \*